United States Patent [19]

Fujimoto

[11] Patent Number: 5,500,654

[45] Date of Patent: Mar. 19, 1996

[54] VGA HARDWARE WINDOW CONTROL SYSTEM

[75] Inventor: Akihisa Fujimoto, Tokyo, Japan

[73] Assignee: Kabushiki Kaisha Toshiba, Kawasaki, Japan

[21] Appl. No.: 341,058

[22] Filed: Nov. 16, 1994

[30] Foreign Application Priority Data

Dec. 27, 1993 [JP] Japan ................................. 5-347243

[51] Int. Cl.$^6$ .................................................. G09G 5/00
[52] U.S. Cl. ................... 345/132; 345/115; 345/3
[58] Field of Search ............................. 345/3, 121, 115, 345/120, 132, 133

[56] References Cited

U.S. PATENT DOCUMENTS

| | | | |
|---|---|---|---|
| 5,065,346 | 11/1991 | Kawai et al. | 345/132 |
| 5,111,190 | 5/1991 | Zenda | 345/132 |
| 5,218,274 | 6/1993 | Zenda | 345/3 |

FOREIGN PATENT DOCUMENTS 6-332664  12/1994  Japan .

OTHER PUBLICATIONS

IMB, Personal System 2 Hardware Interface Technical Reference—Video Subsystems, Virtual Memory Description and XGA Implementation of Virtual Memory, Sep. 1992, Section 3.

Primary Examiner—Ulysses Weldon
Assistant Examiner—Matthew Luu
Attorney, Agent, or Firm—Finnegan, Henderson, Farabow, Garrett & Dunner

[57] ABSTRACT

A screen CRTC generates a sync signal or the like for controlling a screen area of 1024×768 pixels in accordance with a screen parameter, and a window CRTC controls a display of a window area in accordance with a window parameter. When the display start position of the window is detected by the screen CRTC, display control of the window area performed by the window CRTC is started, thereby sequentially reading VGA data from the start address of a VRAM and converting the VGA data into video data. This video data is supplied to a display monitor during the display period of the window area, thereby displaying the video data in the window area.

17 Claims, 12 Drawing Sheets

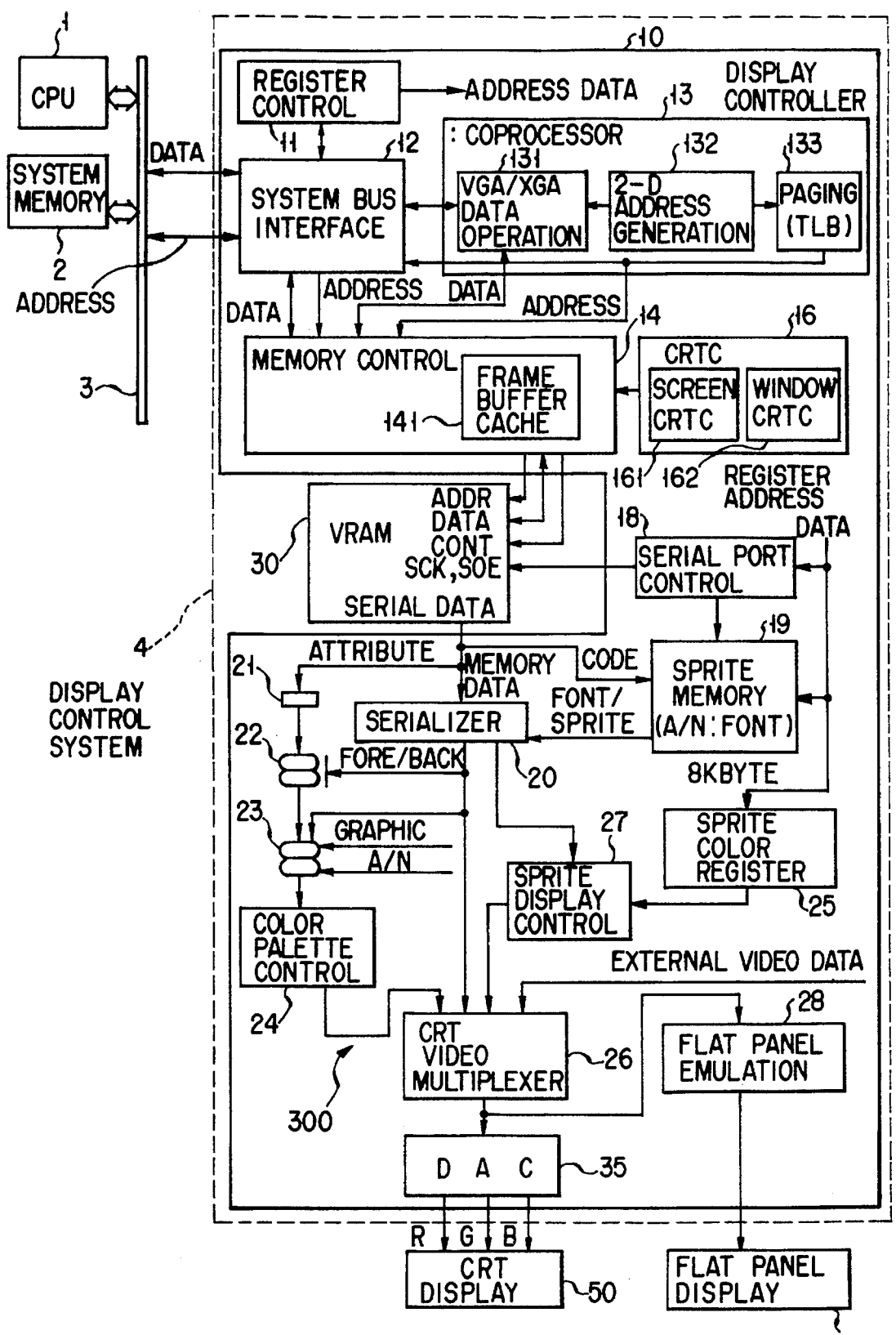
F I G. 1

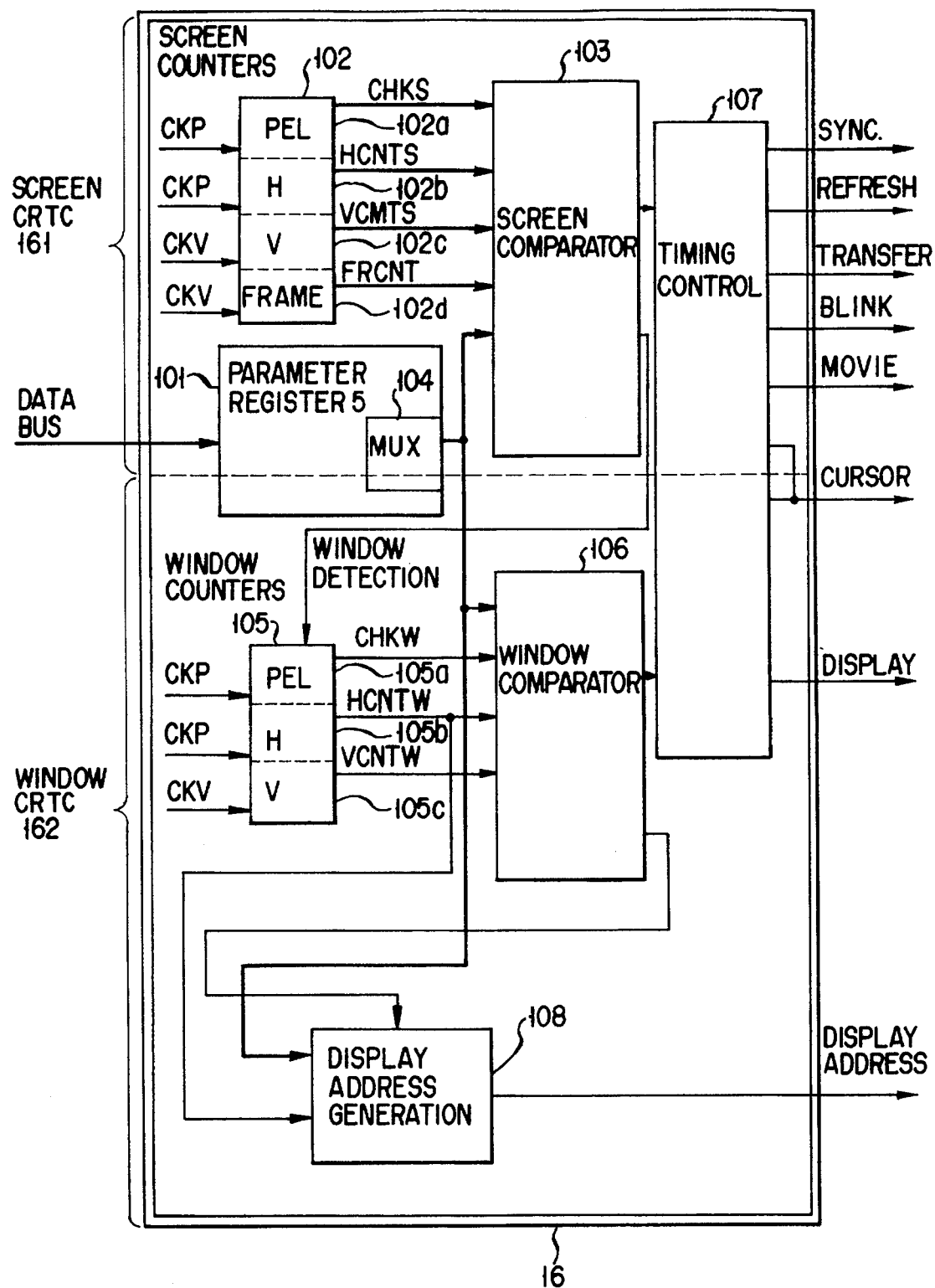
F I G. 3

PARAMETER REGISTERS

101

CRT SCREEN HORIZONTAL/VERTICAL TOTAL
CRT SCREEN HORIZONTAL/VERTICAL DISPLAY END
CRT SCREEN HORIZONTAL/VERTICAL BLANKING
CRT SCREEN HORIZONTAL/VERTICAL SYNC
CRT SCREEN HORIZONTAL SYNC SKEW

FLAT PANEL HORIZONTAL/VERTICAL TOTAL
FLAT PANEL HORIZONTAL/VERTICAL DISPLAY END
FLAT PANEL HORIZONTAL/VERTICAL BLANKING
FLAT PANEL HORIZONTAL/VERTICAL SYNC
FLAT PANEL HORIZONTAL SYNC SKEW

WINDOW HORIZONTAL/VERTICAL TOTAL
WINDOW HORIZONTAL/VERTICAL DISPLAY END
WINDOW HORIZONTAL/VERTICAL BLANKING
WINDOW HORIZONTAL/VERTICAL SYNC
WINDOW HORIZONTAL SYNC SKEW

WINDOW DISPLAY START POSITION COORDINATES
EXTERNAL VIDEO DISPLAY START POSITION COORDINATES,
EXTERNAL VIDEO WINDOW SIZE
DISPLAY CONTROL REGISTER

F I G. 4

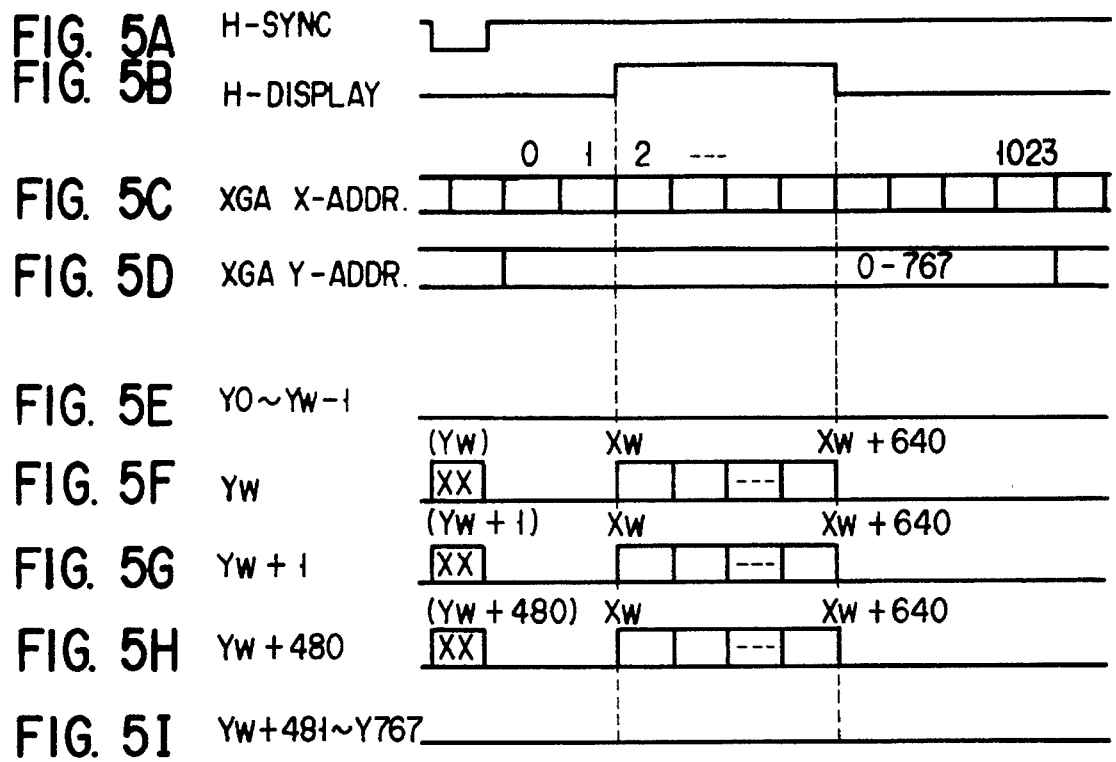
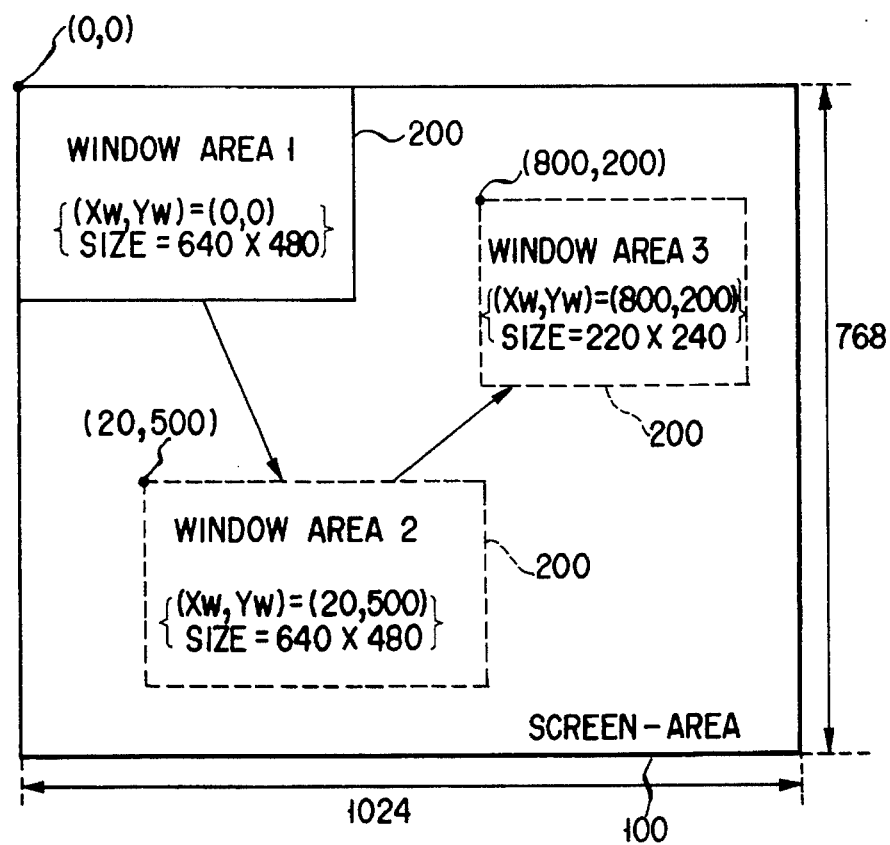
FIG. 6

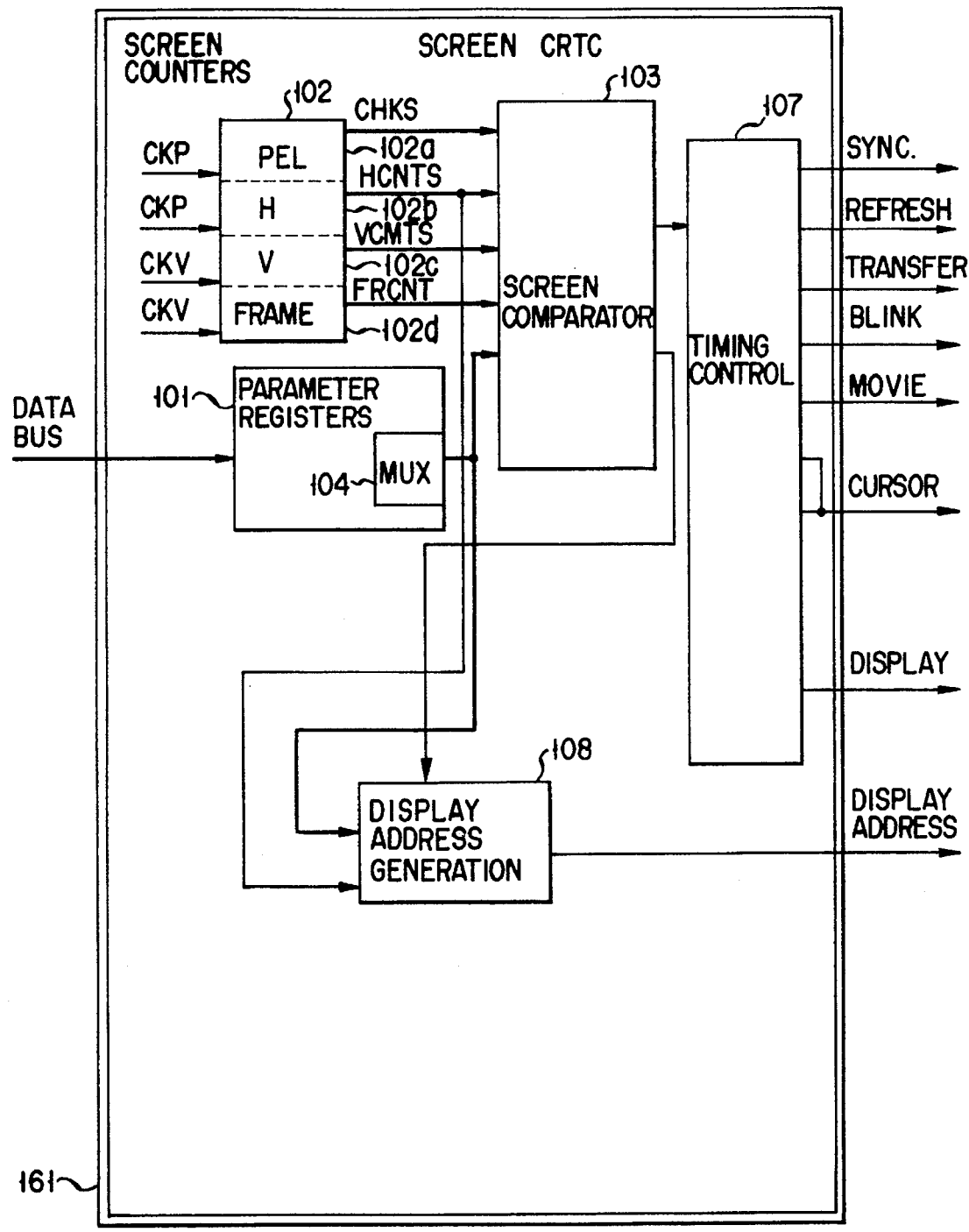
F I G. 10

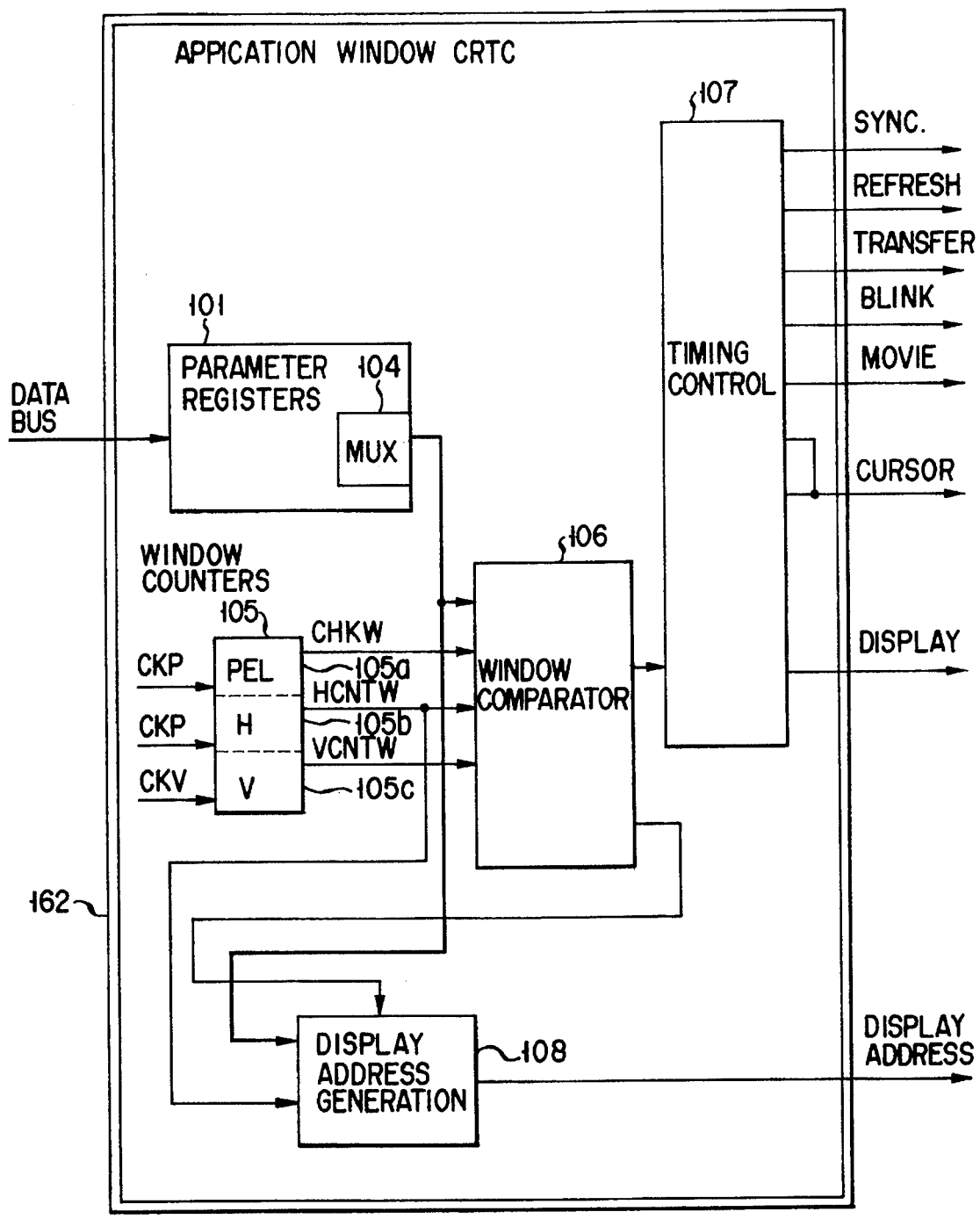
F I G. 12

VGA HARDWARE WINDOW CONTROL SYSTEM

BACKGROUND OF THE INVENTION

1. Field of the Invention

The present invention relates to a display control apparatus and, more particularly, to a display control apparatus for controlling a display monitor used in a computer system such as a personal computer.

2. Description of the Related Art

In general, as display monitors for computer systems such as personal computers CRT display, or flat panel displays such as a liquid crystal display and a plasma display are used. At present, these displays are controlled using display controllers called VGA (Video Graphics Array) display controllers.

For this reason, a large number of application programs started on a computer system are formed to be suitable for the VGA specifications. In the VGA display controller, a mode of simultaneously displaying a maximum of 256 colors in 640×480 pixels and the like are prepared.

However, advanced operations using a high-saturation screen as in DTP (Desk Top Publishing) are requested for recent computer systems. For this reason, the resolution and the number of display colors provided by the VGA display controller have not been suitable for these advanced operations.

Therefore, in a recent computer system, a display controller of XGA (Extended Graphics Array) specifications or SVGA (Super Video Graphics Array) specifications having a display mode capable of realizing a display having a resolution higher than that of the VGA specifications begins to be used. In the display controller of the XGA specifications, since a high-resolution mode or the like of 1024×768 pixels is prepared, a large number of windows can be displayed on the same screen. For this reason, the display controller of the XGA specifications can be used to perform DTP operations, and can satisfactorily provide performance required for a graphical user interface which frequently uses a window display.

In the display controller, in order to cope with different resolutions of the XGA and VGA specifications, a switching operation between a high-resolution display of 1024×768 pixels and an intermediate-resolution display of 640×480 pixels is performed using a multi-sync CRT display. In this case, both high-resolution data and intermediate-resolution data are displayed on an entire display screen in a full-screen mode by a synchronous process in the CRT display.

However, when application programs of the XGA and VGA specifications are simultaneously executed, and the screen data of these application programs are alternately switched to be displayed, and screens having different resolutions are frequently switched to each other, flicker may disadvantageously occur on a display screen, depending on a CRT display, each time the switching operation is performed.

When intermediate-resolution data is displayed on the CRT display in a high-resolution mode, the problem of flicker occurring in relation to synchronism can be solved. However, in this case, the intermediate-resolution data is displayed at the corner of the screen, and visual recognition for the data is degraded. This problem is also posed when intermediate-resolution data of 640×480 pixels is displayed on a flat panel display having a high-resolution screen of 1024×768 pixels. In this case, the display position of the intermediate-resolution data is fixed to a specific position on the high-resolution screen, and this display position cannot be changed by the designation of a user.

SUMMARY OF THE INVENTION

The present invention has been made in consideration of the above points, and has as its object to provide a display control apparatus capable of displaying intermediate- or low-resolution data on a high-resolution screen as a window having an arbitrary position and an arbitrary size.

In order to achieve the above object, according to the present invention, there is provided a display control apparatus for controlling a display monitor of a computer system, comprising an image memory for storing, from a predetermined storage start position, display data formed by an application program executed by the computer system, programmable parameter registers in which various parameter values designated by the system are set, the parameter resisters being arranged such that a screen parameter for designating a size of an entire display screen area which can be displayed on the display monitor, and a window parameter for designating a display start position and a size of a window area to be displayed in the entire display screen area are set, a first display control circuit for controlling the entire display screen area in accordance with the screen parameter, the first display control circuit including means for generating horizontal and vertical sync signals of the display monitor in response to a scanning timing for displaying the entire display screen area on the display monitor, means for generating a coordinate address indicating a scanning position on the entire display screen area in response to the scanning timing, and means for comparing a window area display start position designated by the window parameter with a value of the coordinate address to generate, on the basis of a comparison result, a window area detection signal indicating that the scanning position on the entire display screen area reaches the display start position of the window area, a second display control circuit for controlling the window area in accordance with the window parameter, the second display control circuit including means for generating a display enable signal indicating a display period corresponding to the window area in response to the window area detection signal, and means for generating a memory address for reading out the display data from the storage start position of the image memory in response to the window area detection signal, means for reading out the display data from the storage start position of the image memory in accordance with the memory address generated by the second display control circuit to convert the display data into video data which is to be supplied to the display monitor, and means for supplying the video data to the display monitor in the display period designated by the display enable signal such that the display data formed by the application program is displayed in the window area.

In the display control apparatus, the two display control circuits, i.e., the first and second display control circuits, are arranged. The first display control circuit generates the sync signal for controlling the entire display screen area in accordance with the screen parameter, and the second display control circuit controls the display of the window area in accordance with the window parameter. When the window area is detected by the first display control circuit, the display control of the window area is started by the second display control circuit, thereby sequentially reading out display data from the storage start position of the image memory and converting the display data into video data. This video data is supplied to the display monitor during the display period of the window area defined by the display enable signal, thereby displaying the video data in the window area.

In this case, the position and size of the window area can be programmably changed by the value of the window parameter set in the parameter registers. Therefore, intermediate- or low-resolution data formed by an application program can be displayed on a high-resolution display screen at an arbitrary position to have an arbitrary size.

In addition, in the display control apparatus, the data to be displayed in the window area is read out from the data storage start position of the image memory obtained by the application program. For this reason, a window display can be performed without changing the data storage position of the image memory while the existing application program is used without any change.

In addition, the display control apparatus of the present invention has a mode in which a window parameter is used in place of a screen parameter. For this reason, a parameter value used in the first display control circuit becomes equal to a window parameter value used in the second display control circuit, thereby generating a horizontal/vertical sync signal corresponding to the size of the window area. In this case, when a CRT display is used, intermediate- or low-resolution data formed by an application program is displayed on the entire display screen of the CRT display in a full-screen mode.

BRIEF DESCRIPTION OF THE DRAWINGS

FIG. 1 is a block diagram showing the overall arrangement of a display control apparatus according to an embodiment of the present invention;

FIG. 3 is a block diagram showing the detailed arrangement of the screen CRTC and the window CRTC arranged in the display control apparatus shown in FIG. 1;

FIG. 4 is a view for explaining parameter registers referred to by the screen CRTC and window CRTC in FIG. 3;

FIGS. 5A through 5I are timing charts for explaining the control operation of display timings executed by the screen CRTC and window CRTC in FIG. 3;

FIG. 6 is a view showing an example of the relationship between the window parameter value and the display position of the window area in FIG. 2;

FIG. 10 is a detailed block diagram of the screen CRTC shown in FIG. 9;

FIG. 12 is a detailed block diagram of the application window CRTC shown in FIG. 9.

DETAILED DESCRIPTION OF THE PREFERRED EMBODIMENTS

Figure 2:
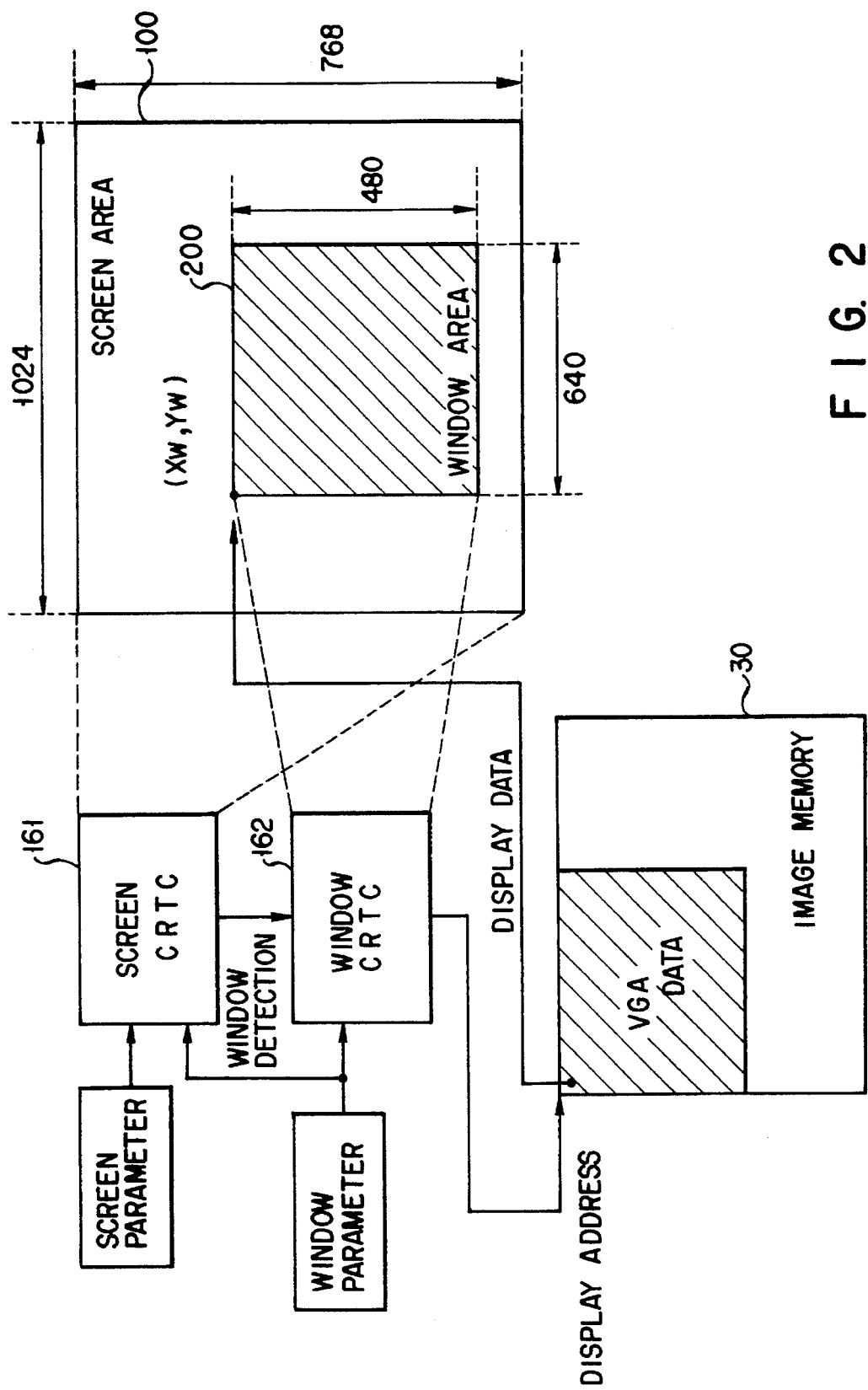
FIG. 2 is a view for explaining the principle of display control using a screen CRTC and a window CRTC arranged in the display control apparatus shown in FIG. 1.

The preferred embodiments of the present invention will be described below with reference to the accompanying drawings.

FIG. 1 shows the overall arrangement of a display control system according to an embodiment of the present invention. A display control system 4 is a display control system which supports XGA (Extended Graphics Array) specifications having a display mode of simultaneously displaying a maximum of 256 colors at a resolution of 1024×768 dots, and is connected to a CPU local bus 3 of a portable computer. The display control system 4 performs display control for both a flat panel display 40 equipped as a standard device on the portable computer main body and a color CRT display 50 detachably connected to the portable computer main body.

The display control system 4 comprises a display controller 10 and a dual port image memory (VRAM) 30. The display controller 10 and the dual port image memory (VRAM) 30 are mounted on a circuit board (not shown).

The display controller 10 is an LSI realized by a gate array, and constitutes the main part of the display control system 4. The display controller 10 is controlled by an instruction from a host CPU 1, and executes display control for the flat panel display 40 and the color CRT display 50 using the dual port image memory (VRAM) 30. In addition, the display controller 10 functions as a bus master, and can directly access a system memory 2 of the personal computer.

The dual port image memory (VRAM) 30 comprises a serial port (serial DATA) used for serial access and a parallel port (DATA) for random access. The serial port (serial DATA) is used for reading out data for refreshing a display screen, and the parallel port (DATA) is used for updating image data. The dual port image memory (VRAM) 30 comprises a plurality of dual port DRAMs, and has a 1-Mbyte to 4-Mbyte storage capacity. The dual port image memory (VRAM) 30 is used as a frame buffer, and image data to be displayed on the flat panel display 40 or the color CRT display 50 is drawn in the dual port image memory (VRAM) 30.

In this case, XGA drawn data which is formed by an application program or the like suitable for XGA specifications is stored from the start address of the dual port image memory (VRAM) 30. This packed pixel method is a color information mapping method in which one pixel is represented by a plurality of continuous bits on the memory. For example, as the packed pixel method, a method in which one pixel is represented by 1, 2, 4, 8, or 16 bits is employed. On the other hand, VGA drawn data is formed by an application program or the like suitable for VGA specifications. This data is drawn from the start address of the dual port image memory (VRAM) 30 by a memory plane method. This memory plane method is a method in which a memory area is divided into a plurality of planes designated by the same address, and color information of each pixel is assigned to a corresponding one of the planes. For example, when four planes are present, one pixel is expressed by data of a total of 4 bits obtained by assigning one bit to each plane.

Text data is also stored in the dual port image memory (VRAM) 30. In either XGA or VGA specifications, 1-character text data has a size having a total of 2 bytes consisting of an 8-bit code and an 8-bit attribute. The attribute consists of 4-bit data for designating a foreground color and 4-bit data for designating a background color.

The display controller 10 comprises a register control circuit 11, a system bus interface 12, a drawing coprocessor 13, a memory control circuit 14, a CRT controller (CRTC) 16, a serial port control circuit 18, a sprite memory 19, a serializer 20, a latch circuit 21, a foreground/background multiplexer 22, a graphic/text multiplexer 23, a color palette control circuit 24, a sprite color register 25, a CRT video multiplexer 26, a sprite display control circuit 27, a flat panel emulation circuit 28, and a DAC (D/A converter) 35.

The register control circuit 11 receives an address and data from the system bus 3 through the system bus interface 12 to decode the address and perform read/write control to various registers designated by the result obtained by the decoding operation. The system bus interface 12 performs interface control with respect to the host CPU 1 through the local bus 3, and supports not only the local bus but also a bus interface suitable for system buses of various specifications such as ISA, EISA, and Micro Channel Architecture.

The drawing coprocessor 13 is a graphic accelerator, and provides various drawing functions to the drawn data in the dual port image memory (VRAM) 30 in response to an instruction from the CPU 1. The drawing coprocessor 13 has a memory management function or the like performed by performing pixel block transfer such as BITBLT, drawing of a line, filling of an area, a logical/arithmetic operation between the pixels, cutting of a screen, masking of a map, and addressing and paging in X-Y coordinate system. The drawing coprocessor 13 comprises a VGA/XGA data operation circuit 131, a two-dimensional (2-D) address generation circuit 132, and a paging unit 133.

The data operation circuit 131 performs data operations such as shifting, a logical/arithmetic operation, bit-masking, and color comparison, and also has a BITBLT function compatible with the VGA specifications. The two-dimensional address generation circuit 132 generates an X-Y two-dimensional address for performing access to a rectangular area or the like. In addition, the two-dimensional address generation circuit 132 also performs a translation process to a linear address (real memory address) using area checking, segmentation, or the like. The paging unit 133 is used for supporting the same virtual memory mechanism as that of the CPU 1. In a valid paging mode, the paging unit 133 translates a linear address formed by the two-dimensional address generation circuit 132 into a real address by paging. In an invalid paging mode, the linear address is directly used as a real address. This paging unit 133 comprises a TLB to perform paging.

The memory control circuit 14 is used for performing access control of the dual port image memory (VRAM) 30, and performs access control of the parallel port of the dual port image memory (VRAM) 30 in accordance with a read/write request of image data from the CPU 1 or the drawing coprocessor 13, and controls an operation of reading out data from the serial port of the dual port image memory (VRAM) 30.

In addition, a frame buffer cache 141 is incorporated in the memory control circuit 14. The frame buffer cache 141 is used for increasing the speed of the read/write access to image data by the CPU 1 or the drawing coprocessor 13, and partially holds the image data of the dual port image memory (VRAM) 30. When image data requested to be read out by the CPU 1 or the drawing coprocessor 13 is present in the frame buffer cache 141, the image data is read out from the frame buffer cache 141 and transferred to the CPU 1 or the drawing coprocessor 13. In this case, read access is not performed through the parallel port of the dual port image memory (VRAM) 30.

The CRT controller (CRTC) 16 generates various display timing signals (a horizontal sync signal, a vertical sync signal, and the like) for controlling the flat panel display 40 or the color CRT display 50, or a display address for reading out, from the serial port (serial DATA) of the dual port image memory (VRAM) 30, image data to be displayed on a screen. In the CRT controller 16, a screen CRTC 161 and a window CRTC 162 are arranged. The screen CRTC 161 is used for controlling the entire display screen area (to be referred to as a screen hereinafter) which can be displayed on the display monitor of the flat panel display 40 or the color CRT display 50, and the window CRTC 162 controls a display area (to be referred to as a window hereinafter) having an arbitrary position and an arbitrary size which are defined in the screen. The arrangement of the CRT controller 16 serves as the characteristic feature of the present invention. The arrangement will be described later in detail with reference to the drawings from FIG. 2.

The serial port control circuit 18, the sprite memory 19, the serializer 20, the latch circuit 21, the foreground/background multiplexer 22, the graphic/text multiplexer 23, the color palette control circuit 24, the sprite color register 25, the CRT video multiplexer 26, the sprite display control circuit 27, the flat panel emulation circuit 28, and the DAC (D/A converter) 35 constitute a display control circuit 300 for displaying the image data of the dual port image memory (VRAM) 30 on the flat panel display 40 or the color CRT display 50.

The serial port control circuit 18 generates a serial clock SCK and an output enable signal SOE for controlling a timing of reading out data from the serial port of the dual port image memory (VRAM) 30. In addition, the serial port control circuit 18 controls access to the sprite memory 19 and controls a timing of displaying a sprite.

In the sprite memory 19, sprite data is written in a graphic mode, and a font is written in a text mode. In the text mode, the code of text data read out from the dual port image memory (VRAM) 30 is supplied to the sprite memory 19 as an index, and a font corresponding to the code is read out.

The serializer 20 is a parallel/serial conversion circuit for dividing parallel pixel data for a plurality of pixels in units of pixels (serial) to output the divided pixel data. In a graphic mode, memory data read out from the serial port of the dual port image memory (VRAM) 30 and sprite data read out from the sprite memory 19 are parallel/serial-converted. In a text mode, font data read out from the sprite memory 19 is parallel/serial-converted.

The latch circuit 21 delays the output timing of an attribute by a delay time required for converting code data into font data. The latch circuit 21 holds the attribute of the text data read out from the dual port image memory (VRAM) 30 in the text mode. The foreground/background multiplexer 22 selects one of the foreground and background colors of the attribute in the text mode. This selection is controlled by a value "1" (foreground) or "0" (background) of font data output from the serializer 20. The graphic/text multiplexer 23 is used for performing a switching operation between the graphic mode and the text mode. Memory data output from the serializer 20 is selected in the graphic mode, and an output from the foreground/background multiplexer 22 is selected in the text mode.

The color palette control circuit 24 is used for performing color conversion of graphic or text data. The color palette control circuit 24 comprises two color palette tables. The first color palette table is constituted by 16 color palette registers. Each color palette register stores 6-bit color palette data. The second color palette table is constituted by 256 color palette registers. Each color palette register stores 18-bit color palette data consisting of R, G, and B data each having 6 bits.

In the graphic mode, XGA memory data of 8 bits/pixel is directly supplied to the second color palette table without passing through the first color palette table, and, in the second color palette table, the memory data is converted into color data consisting of R, G, and B data each having 6 bits. In addition, VGA memory data of 4 bits/pixel is supplied to the first color palette table, and, in the first color palette table, the memory data is converted into 6-bit color data to output it. 2-bit data output from the color selection register incorporated in the color palette control circuit 24 is added to the 6-bit data, thereby obtaining color data of a total of 8 bits. Thereafter, the 8-bit color data is supplied to the second color palette table, and, in the second color palette table, the 8-bit color data is converted into color data consisting of R, G, and B data each having 6 bits.

In the text mode, either XGA or VGA text data is converted into color data consisting of R, G, and B data each having 6 bits through the first and second color palette tables.

In an XGA graphic mode, a direct color mode in which one pixel consists of 16 bits is available. In this case, the memory data of 16 bits/pixel is directly supplied to the CRT video multiplexer 26 without passing through the color palette control circuit 24.

The sprite color register 25 stores sprite display data for designating the display color of a sprite such as a hardware cursor. The CRT video multiplexer 26 is used for selecting a CRT video display output, and performs a selection operation among an output from the color palette control circuit 24, a direct color output from the serializer 20, sprite display data, and external video data. This selection operation is controlled by a display timing signal from the CRT controller 16. The external video data is video data such as moving picture data input from the outside of the display control system 4. The sprite display control circuit 27 outputs the sprite display data of the sprite color register 25 in accordance with the sprite data parallel/serial-converted by the serializer 20.

The flat panel emulation circuit 28 converts a CRT video output to generate flat video data for the flat panel display 40. The DAC 35 converts the CRT video data output from the CRT video multiplexer 26 into analog R, G, and B signals and supplies them to the color CRT display 50.

The principle of display control using the screen CRTC 161 and the window CRTC 162 will be described below with reference to FIG. 20

A screen area 100 is an entire display screen (1024×768 pixels) which can be displayed on a display monitor coping with a high resolution in the XGA specifications. The screen area 100 corresponds to the entire panel area of the flat panel display 40 or the display area of the color CRT display 50 in a high-resolution mode. A window area 200 is an application display area, and has a size of 640×480 pixels corresponding to, e.g., a VGA application program. The display start position of the window area 200 is designated by coordinates (Xw, Yw).

In this case, the screen area 100 is controlled by the screen CRTC 161, and the window area 200 is controlled by the window CRTC 162.

More specifically, the screen CRTC 161 generates a horizontal/vertical sync signal for controlling the screen of 1024×768 pixels designated by a screen parameter, and compares a coordinate address indicating a scanning position on the screen area 100 with the window display start position coordinates (Xw,Yw) designated by the window parameter. If the coordinate address coincides with the window display start position coordinates, the screen CRTC 161 generates a window detection signal. The window CRTC 162 begins to be operated in response to the window detection signal, and controls the display of the window area 200 in accordance with the window parameter.

In this case, the window CRTC 162 controls the window area having the window size designated by the window parameter as a whole screen, and generates a display address for reading out VGA data from the start line of the VRAM 30 in which drawing is performed by an application program. This display line is updated by +1 in units of 640-dot line scanning operations.

Therefore, when the window display start position coordinates and the window size which are designated by the window parameter are changed, the window area 200 having an arbitrary position and an arbitrary size can be assigned on the screen area 100, and the VGA data formed by the application program can be displayed in the window area 200. In addition, a border color and the like are displayed in the area except for the window area 200.

The detailed arrangement of the CRTC 16 will be described below with reference to FIG. 3.

As shown in FIG. 3, the CRTC 16 comprises parameter registers 101, screen counters 102, a screen comparator 103, a parameter multiplexer 104, window counters 105, a window comparator 106, a timing control circuit 107, and a display address generation circuit 108.

In this case, the screen counters 102 and the screen comparator 103 belong to the screen CRTC 161, and the window counters 105, the window comparator 106, and the display address generation circuit 108 belong to the window CRTC 162. In addition, the parameter registers 101, the parameter multiplexer 104, and the timing control circuit 107 are commonly used by the screen CRTC 161 and the window CRTC 162.

The parameter registers 101 are readable/writable registers connected to a data bus defined by the local bus 3. In the parameter registers 101, a CRT screen parameter, a flat panel screen parameter, and a CRT/flat panel window parameter are set. The types of registers arranged as the parameter registers 101 are shown in FIG. 4.

The CRT screen parameter is a parameter for defining the display screen size of a CRT in a high-resolution mode. This parameter is set in parameter registers such as a horizontal/vertical total register for designating the total number of horizontal characters/the total number of vertical lines of the CRT screen, a horizontal/vertical display end register, a horizontal/vertical blanking register, a horizontal/vertical sync register, and a horizontal sync skew register.

The flat panel screen parameter is a parameter for defining the display screen size or the like of the entire panel area.

This parameter is set in a parameter register such as a flat panel screen horizontal/vertical total register, a horizontal/ vertical display end register, a horizontal/vertical blanking register, a horizontal/vertical sync register, and a horizontal sync skew register.

The window parameter is used for defining the sizes or the like of the window areas of both the CRT and flat panel. This parameter is set in a window horizontal/vertical total register, a horizontal/vertical display end register, a horizontal/ vertical blanking register, a horizontal/vertical sync register, a horizontal sync skew register, and the like.

In addition, the parameter registers 101 include a window display start position coordinate register, an external video display start position coordinate register, a window size register representing the horizontal/vertical total register or the like, and a display control register. The display control register includes various mode registers such as a register for designating a display switching operation between the CRT and the flat panel, and a register for designating a full-screen mode.

In this case, since the meanings of a horizontal/vertical total parameter, a horizontal/vertical display end parameter, a horizontal/vertical blanking parameter, a horizontal/vertical sync parameter, and a horizontal sync skew parameter are known as CRT control parameters, a description of these parameters will be omitted.

Referring to FIG. 3, the screen counters 102 are used for indicating a scanning position in the screen area 100, and comprise a pixel counter (PEL) 102a, a horizontal counter (H) 102b, a vertical counter (V) 102c, and a frame counter (Frame) 102d. The pixel counter 102a counts pixel positions in one character in response to a pixel clock CKP and performs a count-up operation in units of pixels. The horizontal counter 102b counts horizontal characters in response to the pixel clock CKP, and performs a count-up operation in units of pixels. The vertical counter 102c counts vertical lines in response to a vertical clock CKV, and performs a count-up operation in units of lines. The vertical clock CKV is generated each time a pixel clock CKV for one line is generated. The frame counter 102d performs a count-up operation in units of screens in response to the vertical clock CKV. An output (FRCNT) from the frame counter 102d is used for blinking control or dither control in units of frames.

The screen comparator 103 compares the CRT screen parameter values of the parameter registers 101 or flat panel screen parameter values with the values of the screen counters 102 to detect a scanning position in the screen area 100, and supplies the scanning position detection signal to the timing control circuit 107. In addition, the screen comparator 103 compares the window display start position coordinates of the parameter registers 101, external video display start position coordinates, and the value of the screen counters 102 with each other to detect a window display start position and an external video display start position. When the scanning position on the screen coincides with the window display start position, the screen comparator 103 generates a window area detection signal.

The parameter multiplexer 104 selects a parameter value to be supplied to the screen comparator 103 in accordance with a display mode. For example, when a display is to be performed on the flat panel display 40, a flat panel screen parameter is selected. When a display is to be performed on the color CRT display 50, a window parameter is selected when a full-screen display is performed, and a CRT screen parameter is selected when VGA data is displayed in a high-resolution mode without performing a full-screen display. In any case, a window parameter is always supplied to the window comparator 106.

The window counters 105 are used for indicating a scanning position in the window area 200, and comprise a pixel counter (PEL) 105a, a horizontal counter (H) 105b, and a vertical counter (V) 105c. The pixel counter 105a is used for counting pixel positions in one character in the window area 200 in response to a pixel clock CKP, and performs a count-up operation in units of pixels. The horizontal counter 105b counts horizontal characters in the window area 200 in response to the pixel clock CKP, and performs a count-up operation in units of pixels. The vertical counter 105c counts vertical lines in the window area 200 in response to the vertical clock CKV, and performs a count-up operation in units of lines.

The window comparator 106 compares the window parameter values of the parameter registers 101 with the values of the window counters 105 to detect a scanning position in the window area 200, and supplies the scanning position detection signal to the timing control circuit 107. The window comparator 106 compares a window vertical total value with the value of the vertical counter 105c. If these values coincide with each other, the window comparator 106 supplies a reset signal to the address generation circuit 108.

The timing control circuit 107 generates a horizontal/ vertical sync signal (Sync), a refresh start signal (Refresh) of the VRAM 30, a transfer cycle start signal (Transfer) of the VRAM 30, a blink control signal (Blink), an external video window display enable signal (Movie), an in-screen hardware cursor display enable signal (Cursor) on the basis of an in-screen scanning position detection signal from the screen comparator 103. In addition, the timing control circuit 107 generates a window display enable signal (Display) and an in-window hardware cursor display enable signal (Cursor) on the basis of an in-window scanning position detection signal from the window comparator 106.

In this case, the external video window display enable signal (Movie), the hardware cursor display enable signal (Cursor), and the window display enable signal (Display) are display enable signals for designating the display periods of an external video window, a hardware cursor, and a window area, respectively, and are constituted by horizontal display period signals and vertical display period signals.

The display address generation circuit 108 generates a display address used for a data transfer cycle from the RAM of the VRAM 30 to an SAM on the basis of a window parameter, a count output from the horizontal counter 105b, a line compare signal. More specifically, in the transfer cycle of the VRAM 30, 1-line (for example, 1024 pixels) data of the RAM of the VRAM 30 is transferred to the SAM. The line to be transferred is determined by a display address from the display address generation circuit 108. The value of this display address sequentially counts up by +1 from the start address indicating line 1. When the value reaches a value indicating 480 lines, the value is returned to the value of the start address in response to a reset signal. In addition, this count-up operation is performed each time the count output from the horizontal counter 105b indicates 640 dots.

A display timing control operation performed by the CRTC 16 in FIG. 3 will be described below with reference to the timing charts shown in FIGS. 5A to 5I.

In this case, as shown in FIG. 2, assume that the screen of the window area 200 having an intermediate solution of 640×480 dots of the VGA specifications is displayed in the screen area 100 having a resolution of 1024×768 dots of the XGA specifications. Assume that the coordinates of the display start position in the window area are designated by (Xw, Yw).

FIG. 5A shows a horizontal sync signal (H-SYNC) supplied from the timing control circuit 107 to a display monitor, and FIG. 5B shows a window display enable signal (H-Display), in one horizontal scanning period, generated by the timing control circuit 107. When a screen having a high resolution of 1024×768 dots of the XGA specifications is to be displayed in the screen area 100, the screen area 100 is scanned such that 1024-dot data is displayed in one horizontal line defined by the horizontal sync signal (H-SYNC). In synchronism with this scanning timing, the horizontal counter 102b and the vertical counter 102c respectively output an X-address (X-ADDR) and a Y-address (Y-ADDR) which indicate the scanning position on the screen area 100, as shown in FIGS. 5C and 5D. The X-address (X-ADDR) is sequentially incremented in accordance with dots to be scanned. In addition, the Y-address (Y-ADDR) is incremented each time a display line to be scanned is updated.

FIGS. 5E through 5I show VRAM access timings obtained when scanning positions are set at Y-coordinate (indicating a scanning position)=Y0 to Yw−1, Y-coordinate=Yw, Y-coordinate=Yw+1, Y-coordinate=Yw+480, and Y-coordinate=Yw+481 to Y767, respectively. In this case, "XX" indicates a data transfer cycle for transferring VGA data from the RAM of the VRAM 30 to the SAM. This data transfer cycle, as shown in FIGS. 5F through 5H, is set in a horizontal blanking period, and a display address for a data transfer cycle is updated in each horizontal blanking period.

In the data transfer cycle, 1-line data (1024 dots) of a VRAM 30 designated by the display address is read out.

In the range of Y-coordinate=Y0 to Yw−1 and the range of Y-coordinate=Yw+481 to Y767, only the CRTC 161 is operated, and the window CRTC 162 is not operated. In the range of Y-coordinate=Yw to Yw+480, a display address for the data transfer cycle is generated under the control of the window CRTC 162. The value of this display address is counted up by +1 each time the horizontal counter 105b counts 640 dots. 640-dot data of 1024-dot data is displayed on a display in a period in which the window display enable signal (H-Display) is set at high level.

As described above, using the CRTC 16 in FIG. 3, data having an intermediate resolution of 640×480 dots of the VGA specifications is displayed in the window area 200 designated by a window parameter. Therefore, as shown in FIG. 6, when display start position coordinates and a window size (the total number of horizontal characters and the total number of vertical lines) are changed, VGA data having an arbitrary size can be displayed at an arbitrary position on the screen 100 having a resolution of 1024×768 dots. In this case, when the window size is set to be smaller than a size of 640×480 dots, only part of data having an intermediate solution of 640×480 dots for the VGA specifications is displayed in the window area 200.

The same control of the display position of the window area 200 as described above is performed with respect to external video data.

The whole operation of a display controller 10 shown in FIG. 1 will be described below with reference to FIGS. 7 and 8 using, as an example, a case wherein an overlapping display between VGA data, external video data, and a hardware cursor is performed.

Figure 7:
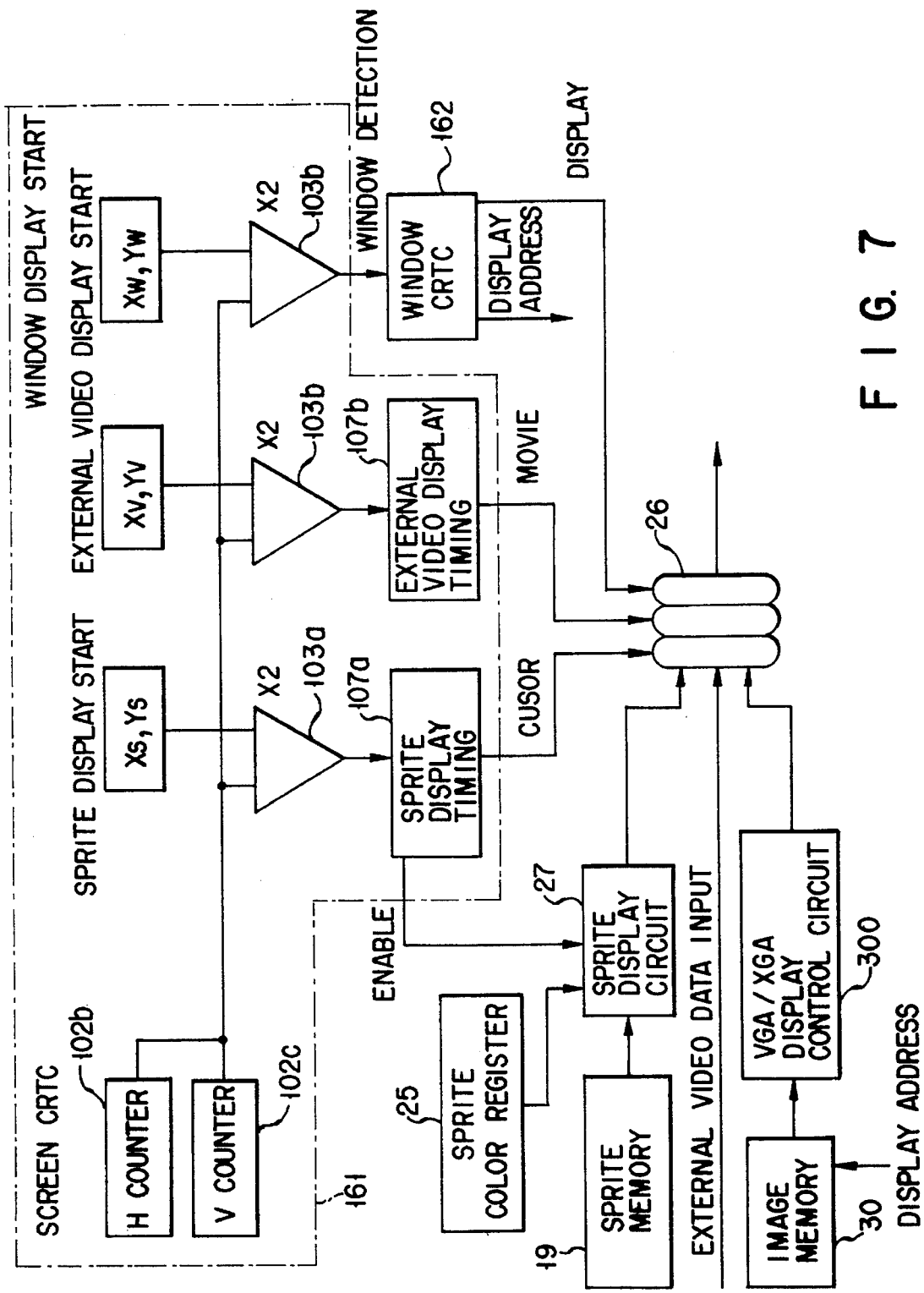
FIG. 7 is a block diagram showing the relationship between timing control performed by a CRTC and the flow of data when an overlapping display is performed by the display control apparatus in FIG. 1.

FIG. 7 shows the relationship between a data flow in the display controller 10 shown in FIG. 1 and timing control operations performed by two CRTCs 161 and 162.

In this case, assume that sprite display start position coordinates for displaying a hardware cursor are designated by (Xs, Ys), the display start position coordinates of an external video window for displaying external video data are designated by (Xv, Yv), and window area start position coordinates for displaying VGA data or the like formed by an application program are designated by (Xw, Yw).

These coordinate data (Xs, Ys), (Xv, Yv), and (Xw, Yw) are compared with the X-address of horizontal counter 102b and the Y-address of the vertical counter 102c by comparators 103a, 103b, and 103c in the screen comparator 103, respectively.

When the value of the vertical counter 102c coincides with Ys, a sprite display timing circuit 107a of a timing control circuit 107 is operated, and an enable signal is supplied to a sprite display control circuit 27. The sprite display control circuit 27 outputs the value of a sprite color register 25 as sprite display data in accordance with sprite data read out from a sprite memory 19 through a serializer 20. When the value of the horizontal counter 102b coincides with Xs, the sprite display timing circuit 107a generates a hardware cursor display enable signal (Cursor). This hardware cursor display enable signal (Cursor) is supplied to a CRT video multiplexer 26, thereby selecting the sprite display data as video data.

When the value of the vertical counter 102c coincides with Yv, an external video display timing circuit 107b of the timing control circuit 107 is operated. When the value of the horizontal counter 102b coincides with Xv, an external video window display enable signal (Movie) is generated. The external video window display enable signal (Movie) is supplied to the CRT video multiplexer 26, thereby selecting the external video data as video data.

Similarly, when the value of the vertical counter 102c coincides with Yw, the window CRTC 162 is operated, and a display address for reading out VGA data from a VRAM 30 is generated. The VGA data is converted into CRT video data by a display control circuit 300. When the value of the horizontal counter 102b coincides with Xw, the window CRTC 162 generates a window display enable signal (Display). This window display enable signal (Display) is supplied to the CRT video multiplexer 26, thereby selecting the VGA data.

Figure 8:
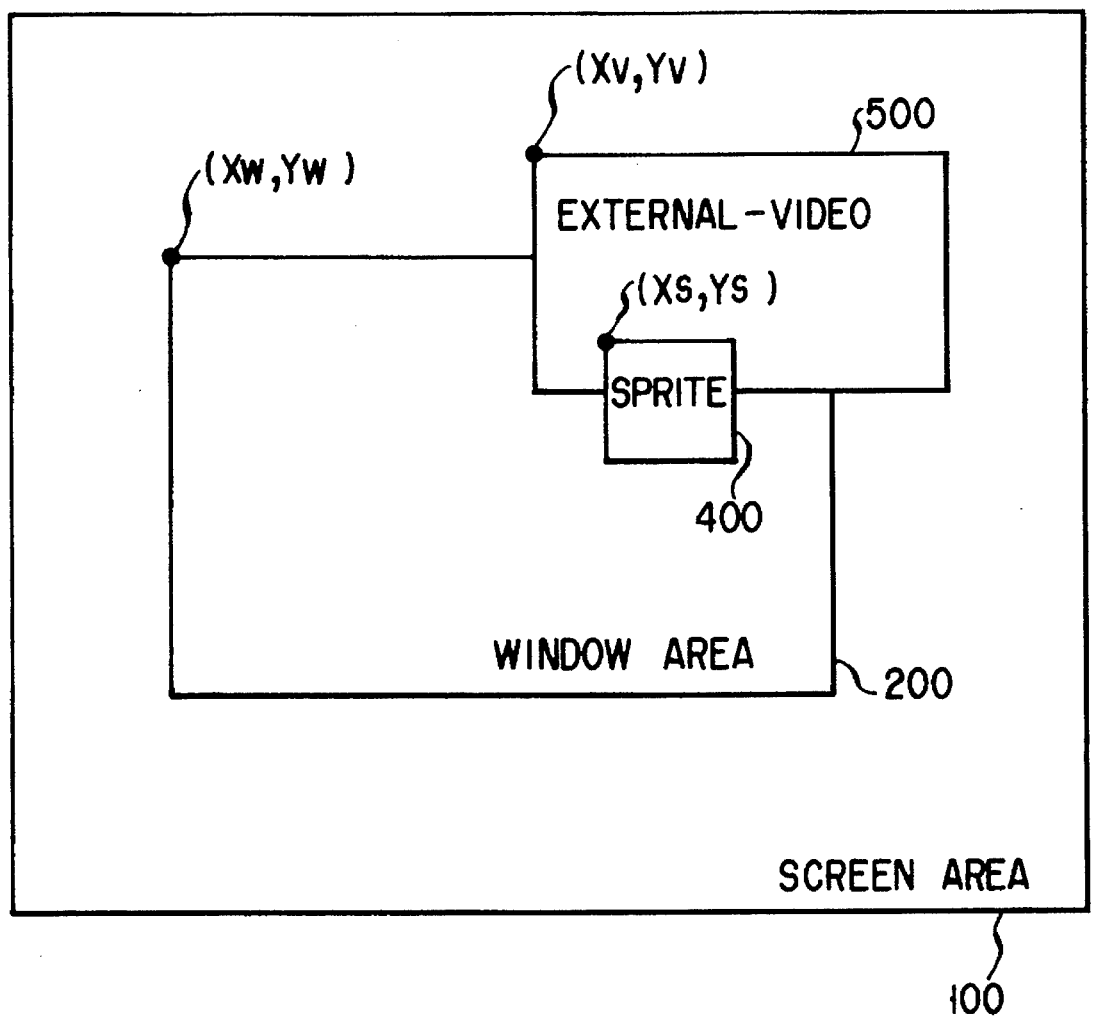
FIG. 8 is a view showing a display screen obtained when an overlapping display is performed by the display control apparatus in FIG. 1.
Figure 9:
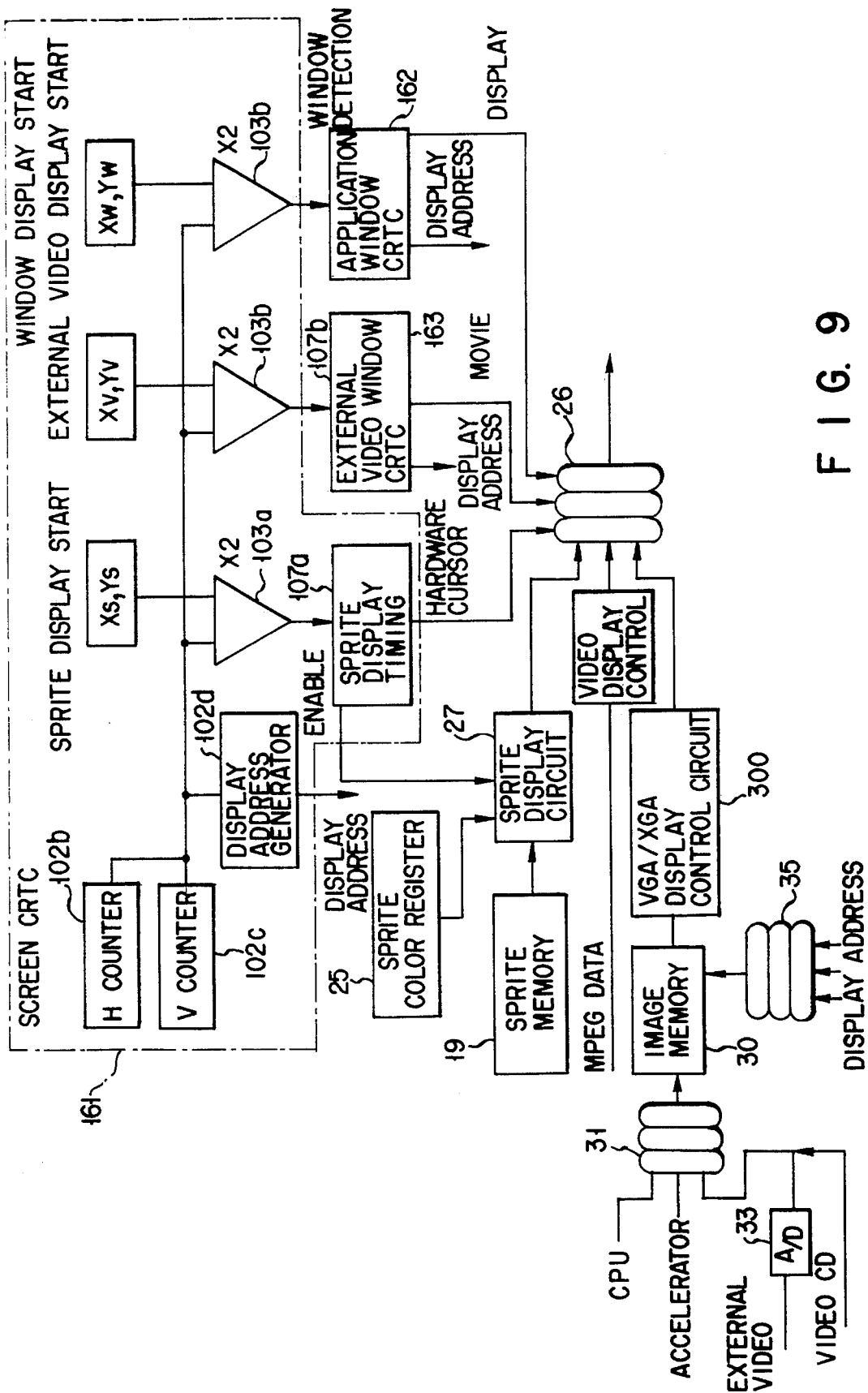
FIG. 9 is a view showing the relationship between the flow of data in a display controller 10 and timing control performed by a screen CRTC, an application window CRTC, and an external video CRTC which are used when an overlapping display between VGA data, XGA data, and external video data is performed.

With the above selecting operation, as shown in FIG. 8, an overlapping display between a window area 200 for a VGA application, an external video window area 500 such as a moving picture, and a sprite area 400 such as a hardware cursor can be performed on a screen area 100 of 1024×768 pixels. In this case, in the overlapping display portion, priority control is performed to select only one of data from the data in the window area 200 for a VGA application, the data in the external video window area 500, and data in the sprite area 400. FIG. 8 shows a display performed in the order of priority, i.e., an order of the sprite, the external video window, and the VGA application. This priority control can be easily realized such that an operation circuit for performing an operation between display period signals is arranged in the control input stage of the CRT video multiplexer 26.

Control for displaying a border color in the area except for the window area 200 for the VGA application can be realized by the following method. That is, a circuit for generating border color data is arranged in the display control circuit 300, and the border color data is selected by the CRT video multiplexer 26 in a period in which no window display enable signal (Display) is generated. In this case, the CRT video multiplexer 26 can be controlled by a signal. This signal indicates a border area and is generated by a horizontal/vertical sync signal and a horizontal/vertical display enable signal (Display).

As described above, in the display controller 10, two display timing control circuits, i.e., the screen CRTC 161 and the window CRTC 162, are arranged. The screen CRTC 161 generates a sync signal or the like for controlling the screen area 100 of 1024×768 pixels in accordance with a screen parameter, and the window CRTC 162 controls a display in the window area 200 in accordance with a window parameter. When the display start position of the window area 200 is detected by the screen CRTC 161, the display control of the window area 200 is started by the window CRTC 162, thereby sequentially reading out VGA data from the start address of the VRAM 30 and converting the VGA data into video data. The video data is supplied to a display monitor in the display period of a window area defined by a window display enable signal (Display), thereby displaying the video data in the window area.

In this case, the position and size of the window area 200 can be programmably changed by the value of a window parameter set in the parameter registers. For this reason, data which has an intermediate resolution and is formed by a VGA application program can be displayed on a high-resolution display screen at an arbitrary position to have an arbitrary size.

In addition, since data is read out from a start address corresponding to a drawing start position to the VRAM 30 obtained by an application program, a window display can be performed without changing the data storage position of the VRAM 30 such that the existing application program is used without any change.

In addition, when, in place of a screen parameter, a window parameter is supplied to the screen CRTC 161 by a parameter multiplexer 104, a parameter value used in the screen CRTC 161 becomes equal to a window parameter value used in the window CRTC 162, thereby generating a horizontal/vertical sync signal corresponding to the size of the window area 200. In this case, when a CRT display 50 is used, data of 640×480 pixels formed by a VGA application program can be displayed in the entire display screen of the CRT display 50 in a full-screen mode.

Note that, since the window CRTC 162 can be realized by a gate circuit which is almost the same as that of the screen CRTC 161, the window CRTC 162 which can effectively use the circuit layout of a conventional CRTC can be designed.

In the above embodiment, a case wherein a VGA window is displayed on a screen of the XGA specifications has been described. However, a VGA window may be displayed on an SVGA (Super Video Graphics Array) screen.

FIGS. 9 through 12 are block diagrams showing the third embodiment of the present invention. In this embodiment, a screen CRTC 161, an application window CRTC 162, and an external video window CRTC 163 are arranged in the CRTC 16 shown in FIG. 1. According to this embodiment, an overlapping display between normal resolution data (for example, VGA data), high-resolution data (for example, XGA data), and external video data can be performed at an arbitrary position to have an arbitrary size. A display address generator 102d is arranged in the screen CRTC 161. Display data from a CPU 1, display data from an accelerator, digital external video data obtained by converting analog external video data into digital video data through an A/D converter 33, and digital video data from a video CD are selected by a multiplexer 31 and then fetched by the image memory 30.

A display address from the screen CRTC 161, a display address from the external video window CRTC 163, and a display address from the application window CRTC 162 are selected by a multiplexer 35 and then input to the image memory 30. A video display control circuit 37 is constituted by a circuit for converting an input YUV signal into R, G, and B signals, an enlargement/reduction circuit, and the like.

Figure 11:
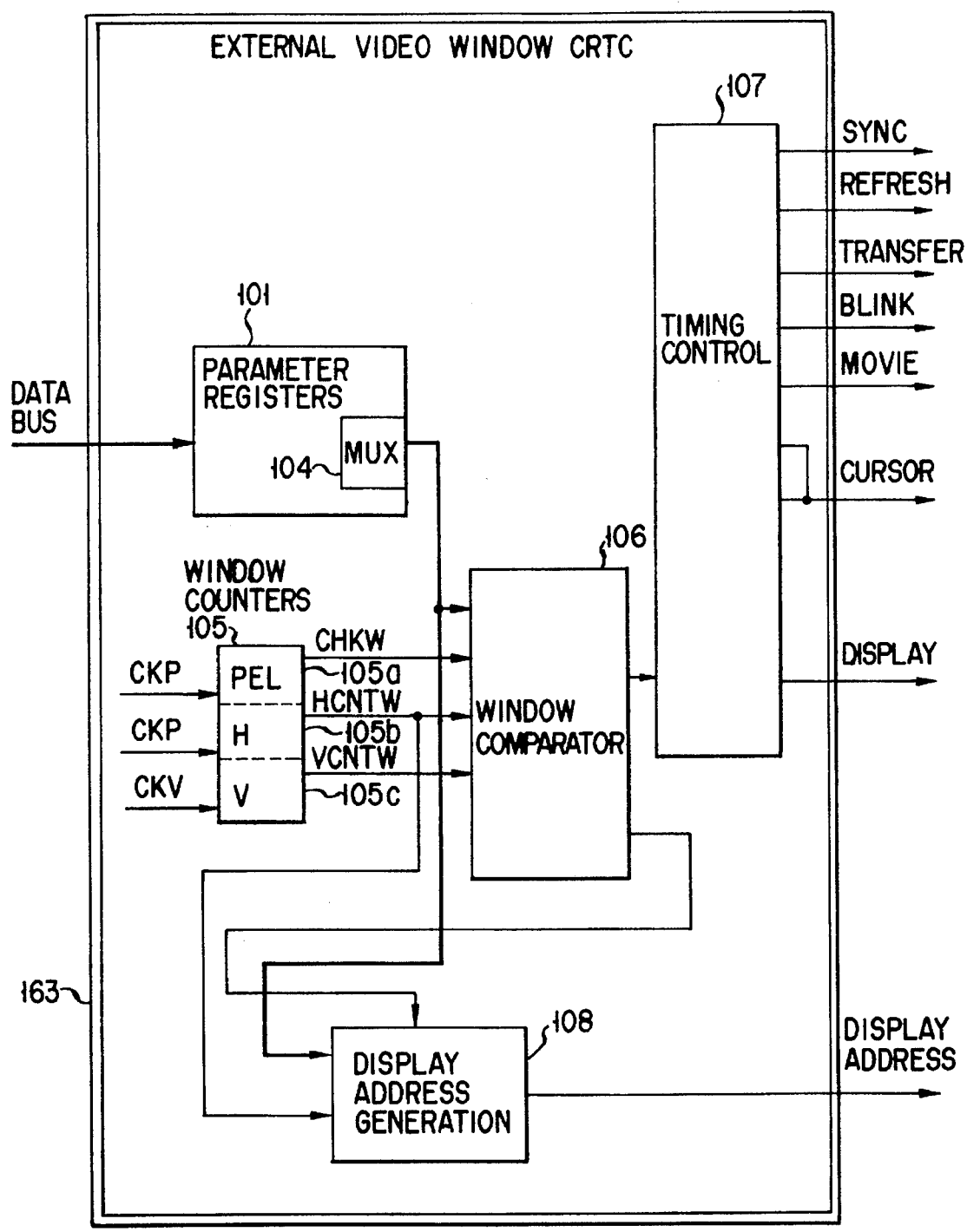
FIG. 11 is a detailed block diagram of the external video CRTC shown in FIG. 9.

FIG. 10 is a detailed block diagram showing the screen CRTC 161, FIG. 11 is a detailed block diagram showing the external video window CRTC 163, and FIG. 12 is a detailed block diagram showing the application window CRTC 162. The internal structure of the external video window CRTC 163 is almost the same as that of the application window CRTC 162. The functions of the screen CRTC 161, the external video window CRTC 163, and the application window CRTC 162 are substantially the same as those in FIG. 3. For this reason, the same reference numerals as in FIG. 3 denote the same parts in each of FIGS. 10 through 12, and a description thereof will be omitted.

Figure 13:
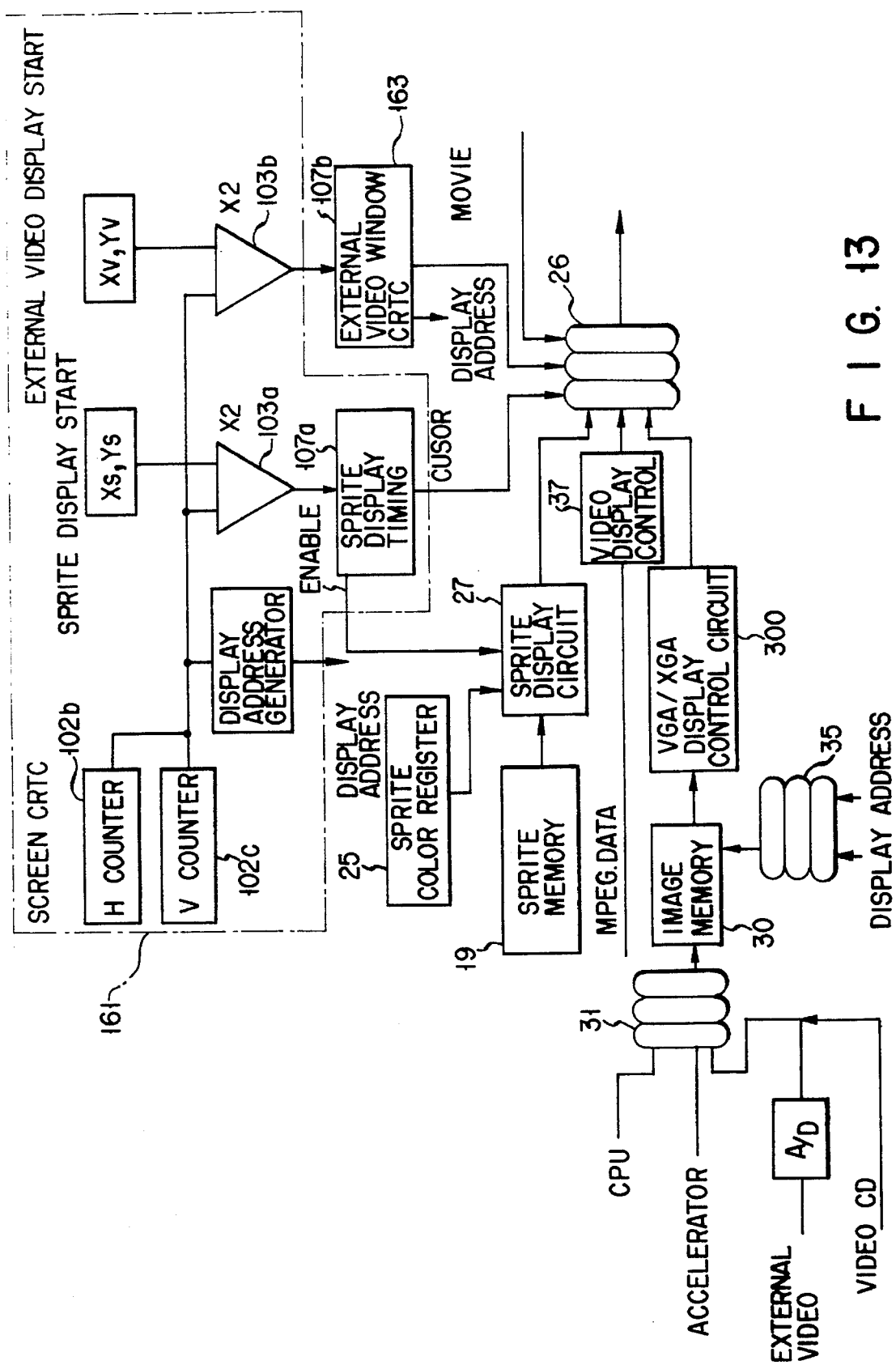
FIG. 13 is a view showing the relationship between the flow of data in the display controller 10 and timing control performed by a screen CRTC and an external video CRTC which are used when an overlapping display between VGA data and external video data is performed.

FIG. 13 is block diagram showing the fourth embodiment of the present invention, and show an embodiment in which an overlapping display between a screen CRTC 161 and an external video window CRTC 163 is performed. In this embodiment, for example, VGA data and moving picture data can be displayed at an arbitrary position to have an arbitrary size. Since the operation of each part in this embodiment is the same as that of the third embodiment, a description of the operation of each part in the fourth embodiment will be omitted.

What is claimed is:

1. A display control apparatus for controlling a display monitor of a computer system, comprising:

an image memory for storing, from a predetermined storage start position, display data formed by an application program executed by said computer system;

programmable parameter registers in which various parameter values designated by said system are set, said parameter registers being arranged such that a screen parameter for designating a size of an entire display screen area which can be displayed on said display monitor, and a window parameter for designating a display start position and a size of a window area to be displayed in said entire display screen area are set;

a first display control circuit for controlling said entire display screen area in accordance with the screen parameter, said first display control circuit including means for generating horizontal and vertical sync signals of said display monitor in response to a scanning timing for displaying said entire display screen area on said display monitor, means for generating a coordinate address indicating a scanning position on said entire display screen area in response to the scanning timing, and means for comparing a window area display start position designated by the window parameter with a value of the coordinate address to generate, on the basis of a comparison result, a window area detection signal indicating that the scanning position on said entire display screen area reaches the display start position of said window area;

a second display control circuit for controlling said window area in accordance with the window parameter, said second display control circuit including means for generating a display enable signal indicating a display period corresponding to said window area in response to the window area detection signal, and means for generating a memory address for reading out the display data from the storage start position of said image memory in response to the window area detection signal;

means for reading out the display data from the storage start position of said image memory in accordance with the memory address generated by said second display control circuit to convert the display data into video data which is to be supplied to said display monitor; and means for supplying the video data to said display monitor in the display period designated by the display enable signal such that the display data formed by the application program is displayed in said window area.

2. An apparatus according to claim 1, further comprising:

a register, arranged in said parameter registers, in which a second window parameter for designating a display start position and a window size of a second window area for displaying external video data, which is externally supplied, in said entire display screen area are set;

means, arranged in said first display control circuit, for comparing a window area display start position designated by the second window parameter with a value of the coordinate address to generate, on the basis of a comparison result, a second window area detection signal indicating that a scanning position on said entire display screen area reaches the display start position of said second window area;

means, arranged in said second display control circuit, for generating a second display enable signal indicating a display period corresponding to said second window area in response to the second window area detection signal; and means for supplying the external video data to said display monitor during the display period designated by the second display enable signal such that the external video data is displayed in said second window area.

3. An apparatus according to claim 1, further comprising:

a register, arranged in said parameter registers, in which a full-screen mode parameter for designating whether the display data is displayed on said display monitor in a full-screen mode is set; and means for switching a parameter value referred to by said first display control circuit from the screen parameter to the window parameter such that said window area is displayed in the full-screen mode when the full-screen mode is designated by the full-screen mode parameter.

4. The apparatus according to claim 1, further comprising a hardware cursor display timing circuit for outputting a hardware cursor display enable signal to thereby display the hardware cursor when the coordinate address indicating a scanning position on said entire display screen area coincides with an address indicating a hardware cursor display start position.

5. A display control apparatus for controlling a flat panel display of a first resolution arranged in a computer system, comprising:

an image memory for storing, from a predetermined storage start position, display data having a second resolution lower than the first resolution and formed by an application program executed by said computer system;

programmable parameter registers in which various parameter values designated by said system are set, said parameter registers being arranged such that a screen parameter for designating the total number of horizontal characters and the total number of vertical lines of a display screen area to be displayed on said display monitor at the first resolution, and a window parameter for designating a display start position, the total number of horizontal characters, and the total number of vertical lines of a window area to display display data of the second resolution in said display screen area are set;

a first display control circuit for controlling said display screen area in accordance with the screen parameter, said first display control circuit including means for generating horizontal and vertical sync signals of said flat panel display in response to a scanning timing for displaying said display screen area of the first resolution on said flat panel display, means for generating a coordinate address indicating a scanning position on said display screen area in response to the scanning timing, means for comparing a window area display start position designated by the window parameter with a value of the coordinate address to generate, on the basis of a comparison result, a window area detection signal indicating that the scanning position on said display screen reaches the display start position on said display screen area;

a second display control circuit for controlling said window area in accordance with the window parameter, said second display control circuit including means for generating a display enable signal indicating a display period corresponding to said window area in response to the window area detection signal, and means for generating a memory address for reading out the display data from the storage start position of said image memory in response to the window area detection signal;

means for reading out the display data from the storage start position of said image memory in accordance with the memory address generated by said window display control circuit to convert the display data into video data which is to be supplied to said display monitor; and means for supplying the video data to said display monitor during a display period designated by the display enable signal such that display data of the second resolution formed by the application program is displayed in said window area.

6. An apparatus according to claim 5, further comprising:

a register, arranged in said parameter registers, in which a second window parameter for designating a display start position and a window size of a second window area for displaying external video data, which is externally supplied, in said entire display screen area are set;

means, arranged in said first display control circuit, for comparing a window area display start position designated by the second window parameter with a value of the coordinate address to generate, on the basis of a comparison result, a second window area detection signal indicating that a scanning position on said entire display screen area reaches the display start position of said second window area;

means, arranged in said second display control circuit, for generating a second display enable signal indicating a display period corresponding to said second window area in response to the second window area detection signal; and means for supplying the external video data to said display monitor during the display period designated by the second display enable signal such that the external video data is displayed in said second window area.

7. An apparatus according to claim 5, further comprising:

a register, arranged in said parameter registers, in which a full-screen mode parameter for designating whether the display data is displayed on said display monitor in a full-screen mode is set; and means for switching a parameter value referred to by said first display control circuit from the screen parameter to the window parameter such that said window area is displayed in the full-screen mode when the full-screen mode is designated by the full-screen mode parameter.

8. An apparatus according to claim 5, wherein the display data of the first resolution is XGA (Extended Graphics Array) data, and the display data of the second resolution is VGA (Video Graphics Array) data.

9. An apparatus according to claim 5, wherein the display data of the first resolution is SVGA (Super Video Graphics Array) data, and the display data of the second resolution is VGA (Video Graphics Array) data.

10. The apparatus according to claim 5, further comprising a hardware cursor display timing circuit for outputting a hardware cursor display enable signal to thereby display the hardware cursor when the coordinate address indicating a scanning position on said entire display screen area coincides with an address indicating a hardware cursor display start position.

11. A display control apparatus for controlling a display monitor of a computer system, comprising:

an image memory for storing, from a predetermined storage start position, display data formed by an application program executed by said computer system;

programmable parameter registers in which various parameter values designated by said system are set, said parameter registers being arranged such that a screen parameter for designating a size of an entire display screen area which can be displayed on said display monitor, an application window parameter for designating a display start position and a size of a window area of an application program to be displayed in said entire display screen area, and an external video window parameter for designating a display start position and a size of a window area of external video data to be displayed in said entire display screen area are set;

a first display control circuit for controlling said entire display screen area in accordance with the screen parameter, said first display control circuit including means for generating horizontal and vertical sync signals of said display monitor in response to a scanning timing for displaying said entire display screen area on said display monitor, means for generating a coordinate address indicating a scanning position on said entire display screen area in response to the scanning timing, means for comparing an application window area display start position designated by the application window parameter with a value of the coordinate address to generate, on the basis of a comparison result, an application window area detection signal indicating that the scanning position on said entire display screen area reaches the display start position of said application window area, and means for comparing an external video window area display start position designated by the external video window parameter with the value of the coordinate address to generate, on the basis of a comparison result, an external video window area detection signal indicating that the scanning position on said entire display screen area reaches a display start position of said video window area;

a second display control circuit for controlling said application window area in accordance with the application window parameter, said second display control circuit including means for generating a display enable signal indicating a display period corresponding to said application window area in response to the application window area detection signal, and means for generating a memory address for reading out the display data from the storage start position of said image memory in response to the application window area detection signal;

a third display control circuit for controlling said external video window area in accordance with the external video window parameter, said third display control circuit including means for generating a display enable signal indicating a display period corresponding to said external video window area in response to the external video window area detection signal, and means for generating a memory address for reading out the display data from the storage start position of said image memory in response to the external video window area detection signal;

means for reading out the display data from the storage start position of said image memory in accordance with a selected one of the memory addresses generated by said second and third display control circuits to convert the display data into video data which is to be supplied to said display monitor; and means for supplying the video data to said display monitor during the display period designated by the display enable signal such that the display data formed in said application window area by the application program is displayed in said application window area and the external video data is displayed in said external video window area.

12. An apparatus according to claim 11, wherein said first display control circuit displays XGA data, said second display control circuit displays VGA data, and said third display control circuit displays moving picture data.

13. An apparatus according to claim 12, wherein the moving picture data is MPEG data.

14. A display control apparatus for controlling a display monitor of a computer system, comprising:

an image memory for storing, from a predetermined storage start position, display data formed by an application program executed by said computer system;

programmable parameter registers in which various parameter values designated by said system are set, said parameter registers being arranged such that a screen parameter for designating a size of an entire display screen area which can be displayed on said display monitor, and an external video window parameter for designating a display start position and a size of a window area of external video data to be displayed in said entire display screen area are set;

a first display control circuit for controlling said entire display screen area in accordance with the screen parameter, said first display control circuit including means for generating horizontal and vertical sync signals of said display monitor in response to a scanning timing for displaying said entire display screen area on said display monitor, means for generating a coordinate address indicating a scanning position on said entire display screen area in response to the scanning timing, and means for comparing an external video window area display start position designated by the external video window parameter with a value of the coordinate address to generate, on the basis of a comparison result, an external video window area detection signal indicating that the scanning position on said entire display screen area reaches the display start position of said external video window area;

a second display control circuit for controlling said external video window area in accordance with the external video window parameter, said second display control circuit including means for generating a display enable signal indicating a display period corresponding to said external video window area in response to the external video window area detection signal, and means for generating a memory address for reading out the display data from the storage start position of said image memory in response to the external video window area detection signal;

means for reading out the display data from the storage start position of said image memory in accordance with the memory address generated by said second display control circuit to convert the display data into video data which is to be supplied to said display monitor; and means for supplying the video data to said display monitor in the display period designated by the display enable signal such that the external video data is displayed in said external video window area.

15. An apparatus according to claim 14, wherein said first display control circuit displays VGA data, and said second display control circuit displays moving picture data.

16. An apparatus according to claim 15, wherein the moving picture data is MPEG data.

17. The apparatus according to claim 14, further comprising a hardware cursor display timing circuit for outputting a hardware cursor display enable signal to thereby display the hardware cursor when the coordinate address indicating a scanning position on said entire display screen area coincides with an address indicating a hardware cursor display start position.

* * * * *